(12) United States Patent
Stefani

(10) Patent No.: US 9,122,915 B2
(45) Date of Patent: Sep. 1, 2015

(54) METHOD AND APPARATUS FOR FACIAL RECOGNITION BASED QUEUE TIME TRACKING

(71) Applicant: ARINC INCORPORATED, Annapolis, MD (US)

(72) Inventor: Rolf R. Stefani, West River, MD (US)

(73) Assignee: ARINC Incorporated, Annapolis, MD (US)

(*) Notice: Subject to any disclaimer, the term of this patent is extended or adjusted under 35 U.S.C. 154(b) by 140 days.

(21) Appl. No.: 13/621,390

(22) Filed: Sep. 17, 2012

(65) Prior Publication Data

US 2013/0070974 A1 Mar. 21, 2013

Related U.S. Application Data

(60) Provisional application No. 61/535,443, filed on Sep. 16, 2011.

(51) Int. Cl.
*G06K 9/00* (2006.01)

(52) U.S. Cl.
CPC ........ *G06K 9/00295* (2013.01); *G06K 9/00778* (2013.01)

(58) Field of Classification Search
None
See application file for complete search history.

(56) References Cited

U.S. PATENT DOCUMENTS

| | | | |
|---|---|---|---|
| 6,554,705 B1* | 4/2003 | Cumbers | 463/29 |
| 7,392,206 B1* | 6/2008 | Frazier et al. | 705/26.7 |
| 2005/0238213 A1* | 10/2005 | Randazza et al. | 382/124 |
| 2006/0010027 A1* | 1/2006 | Redman | 705/10 |
| 2006/0120571 A1* | 6/2006 | Tu et al. | 382/118 |
| 2007/0127787 A1* | 6/2007 | Castleman et al. | 382/118 |
| 2007/0183686 A1* | 8/2007 | Ioffe | 382/291 |
| 2008/0290182 A1* | 11/2008 | Bell et al. | 235/61 V |
| 2009/0268028 A1* | 10/2009 | Ikumi et al. | 348/150 |
| 2011/0199486 A1* | 8/2011 | Moriya | 348/150 |
| 2013/0260788 A1* | 10/2013 | Bonde et al. | 455/456.1 |

OTHER PUBLICATIONS

Bluetooth, Trademark Reg. No. 2909356. Retrieved from TESS.*
Brickstream. "The Need for Better Airport Service Management." Airport International. Axiomatic, Mar. 31, 2011. Web. Mar. 25, 2014.*

(Continued)

*Primary Examiner* — Chan Park
*Assistant Examiner* — Geoffrey E Summers
(74) *Attorney, Agent, or Firm* — Ronald E. Prass, Jr.; PRASS LLP

(57) ABSTRACT

A method and apparatus for tracking passengers at a travel facility and may include receiving captured facial recognition features of a passenger using a first facial recognition camera at a first known location, determining if the captured facial recognition features of the passenger are stored in a database, wherein if the captured facial recognition features of the passenger are not stored in the database, starting a timer, receiving captured facial recognition features of the passenger using a second facial recognition camera at a second known location, stopping the timer, determining the amount of elapsed time between the received captured facial recognition features of the passenger using the first facial recognition camera at the first known location and the receiving captured facial recognition features of the passenger using the second facial recognition camera at the second known location, outputting the determined amount of elapsed time to at least one or more.

7 Claims, 8 Drawing Sheets

(56) References Cited

OTHER PUBLICATIONS

Bullock, Darcy M., et al. "Automated measurement of wait times at airport security." Transportation Research Record: Journal of the Transportation Research Board 2177.1 (2010): 60-68.*

BLIP Systems. "Airport Queue Management, Airport Passenger Flow." Airport International. Aug. 13, 2010. Web. Apr. 4, 2014.*

U.S. Department of Homeland Security. "Privacy Policy Guidance Memorandum." by Hugo Teufel III. Dec. 29, 2008.*

Brunelli, Roberto, and Tomaso Poggio. "Face recognition: Features versus templates." IEEE transactions on pattern analysis and machine intelligence 15.10 (1993): 1042-1052.*

Brian Sims; MFlow Journey aids passenger flow at London City Airport; http://www.info4security.com/story.asp? sectioncode=11&storycode=4128602&c=1; Jan. 16, 2012.

* cited by examiner

METHOD AND APPARATUS FOR FACIAL RECOGNITION BASED QUEUE TIME TRACKING

PRIORITY INFORMATION

This non-provisional application claims priority from U.S. Provisional Patent Application Ser. No. 61/535,443, filed, Sep. 16, 2011, the content of which are incorporated herein by reference in its entirety.

BACKGROUND OF THE DISCLOSED EMBODIMENTS

1. Field of the Disclosed Embodiments

The disclosed embodiments relate to travel safety management through the use of facial recognition and monitoring.

2. Introduction

Facial recognition has been used for uniquely identifying individuals for some time. Typically, systems deploying Facial Recognition required individuals to stand still and look at the camera in order to have their facial image captured and processed by the system. While this is appropriate for gathering or enrolling necessary data, it has not been practical for use as a method in a more real-time scenario required for tasks such as queue time determination.

SUMMARY OF THE DISCLOSED EMBODIMENTS

A method and apparatus for tracking passengers at a travel facility and the method may include receiving captured facial recognition features of a passenger using a first facial recognition camera at a first known location, determining if the captured facial recognition features of the passenger are stored in a database, wherein if the captured facial recognition features of the passenger are not stored in the database, starting a timer, receiving captured facial recognition features of the passenger using a second facial recognition camera at a second known location, stopping the timer, determining the amount of elapsed time between the received captured facial recognition features of the passenger using the first facial recognition camera at the first known location and the receiving captured facial recognition features of the passenger using the second facial recognition camera at the second known location, outputting the determined amount of elapsed time to at least one of one or more travel facility display devices, one or more administrative display devices, and one or more user display devices.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DESCRIPTION OF THE DISCLOSED EMBODIMENTS

Figure 1:
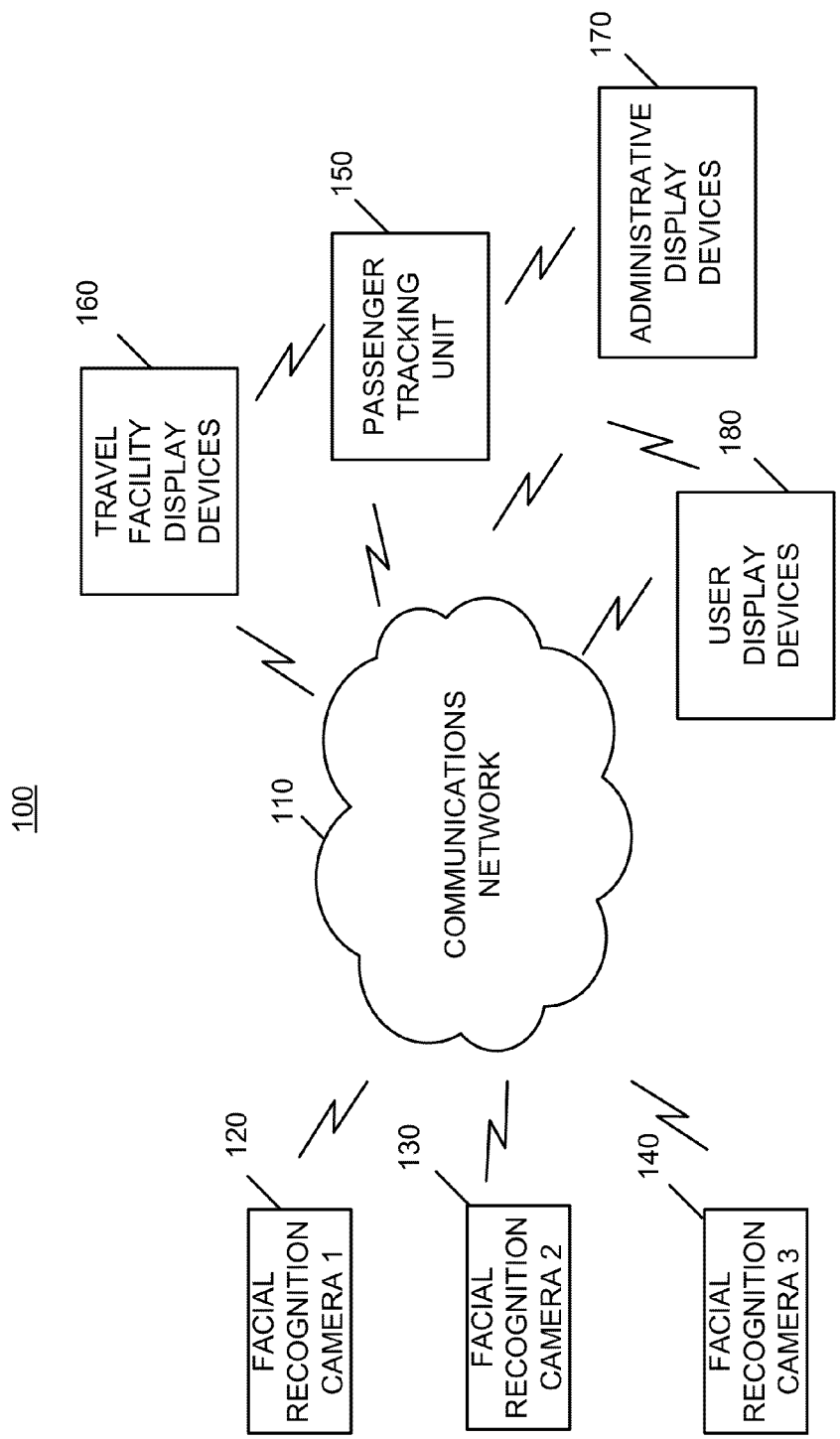
FIG. 1 is an exemplary diagram of a passenger tracking environment in accordance with a possible embodiment of the disclosure.

Additional features and advantages of the disclosed embodiments may be set forth in the description which follows, and in part may be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments may become more fully apparent from the following description and appended claims, or may be learned by the practice of the disclosed embodiments as set forth herein.

Various embodiments of the disclosed embodiments may be discussed in detail below. While specific implementations may be discussed, it should be understood that this be may be done for illustration purposes only. A person skilled in the relevant art may recognize that other components and configurations may be used without parting from the spirit and scope of the disclosed embodiments.

The disclosed embodiments comprise a variety of embodiments, such as a method and apparatus and other embodiments that relate to the basic concepts of the disclosed embodiments. Note that while this disclosure discusses aircraft, airline and travel-related uses for the disclosed embodiments, the disclosed embodiments by no means limited to that area and may be applied to a wide variety of environment and uses.

Conventional facial recognition has been used for uniquely identifying individuals for some time. Typically, systems deploying Facial Recognition required individuals to stand still and look at the camera in order to have their facial image captured and processed by the system. While this is appropriate for gathering or enrolling necessary data, it has not been practical for use as a method in a more real-time scenario required for tasks such as queue time determination.

Instead of using the biometrics/unique facial geometry of specific individuals for security like authentication, the proposed disclosed embodiments concern a method and apparatus for facial recognition based queue time tracking by utilizing facial recognition to simply match facial geometry of faces seen by 2 different cameras within a short time period, for example. This geometry may be extracted from the real-time video stream of each camera.

By using an application hosted on a display/processor that is presenting information to the people walking by them (like flight status information), the system may be able to extract facial templates quickly as a person glances at the display (with an imbedded camera). This process may be a relatively straight forward task of determining the time between image captures and statistical processing to determine dwell or Queue time.

IP based communications and utilization of locally, or remotely hosted data repositories ("cloud") enable the near real-time sharing of facial template and statistical data.

Value Of Queue Time Tracking—Possible Customers/Uses

Security Check Point Transit time knowledge is useful for a number of reasons:

TSA monitoring their own operations performance
On line customers adjusting their travel time
Restaurant and concessions outside security to display real-time info to customers to encourage a longer stay
Duty Free and other users can determine statistics such as dwell time
Way finding applications to integrate critical parameters
Airlines operations to manage "time to gate" parameters for boarding and check in
Airport Management can monitor performance
Face Recognition vs BLUETOOTH® Device Tracking
Newer phones not broadcasting BLUETOOTH® ID
Less than 10% now and this is decreasing rapidly
BLUETOOTH® sniffers that are invasive are questionable in a legal sense.
BLUETOOTH® sniffer systems are more complex and costly.

As BLUETOOTH® range can be larger than distance between detection electronics, more equipment and sophistication is necessary to triangulate and measure signal strength and directionality.

Face Recognition is getting easier to integrate and is relatively low cost.

Do not need to store actual facial images, only mathematical representations of facial features (templates), for example. Facial templates cannot be reconstituted to a facial image, so utilizing facial templates for statistical purposes collects no personally identifiable information.

The use of a display device showing advertisements, flight data, or other information may entice passersby to look at the display, thus elevating the likelihood of successful facial image capture and subsequent facial template generation.

A Simple Approach . . .
2 or more "connected" microFIDS displays with integrated Webcams may be used
The each of the displays may attract the attention of people passing by—enabling Face capture
No Pictures Required . . .
Images NOT saved
Facial Geometry IS Used
Exemplary System Logic Where 3 Distinct Processes May Be Involved in the System
A Face Capturing/Template Database Enrollment Engine.
This application may be resident on first processor/display where users approach the entry to queuing area where transit averages are desired. This application may alternatively be resident as a cloud application utilizing remote cameras connected by TCP/IP using appropriate security protocols to transmit a video stream to a cloud-based server for template generation and storage in a cloud-based database.

No images would need to be stored; only the facial templates. This application would report capture/template generation time to a database server.

A Face Capturing & Matching Engine.
This application may be resident on the second/exit point of the queuing area on the display or processor located there. This application may alternatively be resident as a cloud-based application utilizing remote cameras connected by TCP/IP using appropriate security protocols to transmit a video stream to a cloud-based server for template generation and matching. No images would need to be stored; only the facial templates. This application would report capture/template generation time to a database server.

A Statistics & Display Application.
This application may provide the functionality of gathering and analyzing dwell time records and creating/managing a database accessible to other display clients in order to view data in a meaningful way. This application may also host a display engine to display statistic results in real-time. This application may alternatively be resident as a cloud-based application with access to a cloud-based database server containing statistical information gathered from the capture and matching applications above.

FIG. 1 is an exemplary diagram of a passenger tracking environment 100 in accordance with a possible embodiment of the disclosure. The passenger tracking environment 100 may include a plurality of facial recognition cameras 120, 130, 140, a passenger tracking unit 150, one or more travel facility display devices 160, one or more administrative display devices 170, and one or more user display devices 180, all connected through communications network 110. Note that although the connections in FIG. 1 are shown as a wireless configuration, one or more of these connections may also be wired. While the passenger tracking environment 100 shown relates to an airport as the travel facility, the disclosed embodiments may be applied to other travel facilities, including train stations, cruise ship ports, mass transit stations, etc.

The passenger tracking unit 150 may be a processing device, where the processing device may be a server, a computer, a mobile communication device, a laptop computer, or a personal digital assistant, for example. The communications network 110 may represent any communications network used to communicate with other entities, including the Internet, an intranet, a radio network, a wireless network, etc. The facial recognition cameras 120, 130, 140 represent a plurality of cameras that may be positioned at various locations throughout the travel facility. The facial recognition cameras 120, 130, 140 may be located on or in any area which passengers may frequently pass, such a travel arrival or departure display, baggage information display, beginning and ends of security lines, etc. The facial recognition cameras 120, 130, 140 may have communication capabilities (e.g., wired, wireless, Wi-Fi, RF, remote control, etc.) to transmit the facial recognition data to the passenger tracking unit 150. The devices housing the cameras may also show other information, such as arrival and departure information (for any mode of transportation), train schedules, cruise stops/schedules, subway maps or schedules, bus schedules, area/location/city maps, terminal maps, gate or port facilities, rental car information (e.g., car locations numbers and/or maps, bus stop location, terminal location, etc.), baggage information (location, bag identification, etc.), advertisements, hotel or restaurant information, or weather information (e.g., forecast or current weather information at current location, various destinations, etc.), for example.

The passenger tracking unit 150 may be any server, computer, processing device, personal digital assistant (PDA), or other similar device capable of processing and storing facial recognition data received from the facial recognition cameras 120, 130, 140, matching facial recognition data to previously received facial recognition data, and calculating passenger travel times through the travel facility.

The one or more travel facility display devices 160, one or more administrative display devices 170, and one or more user display devices 180 are discussed below with respect to FIGS. 6-8.

Figure 2:
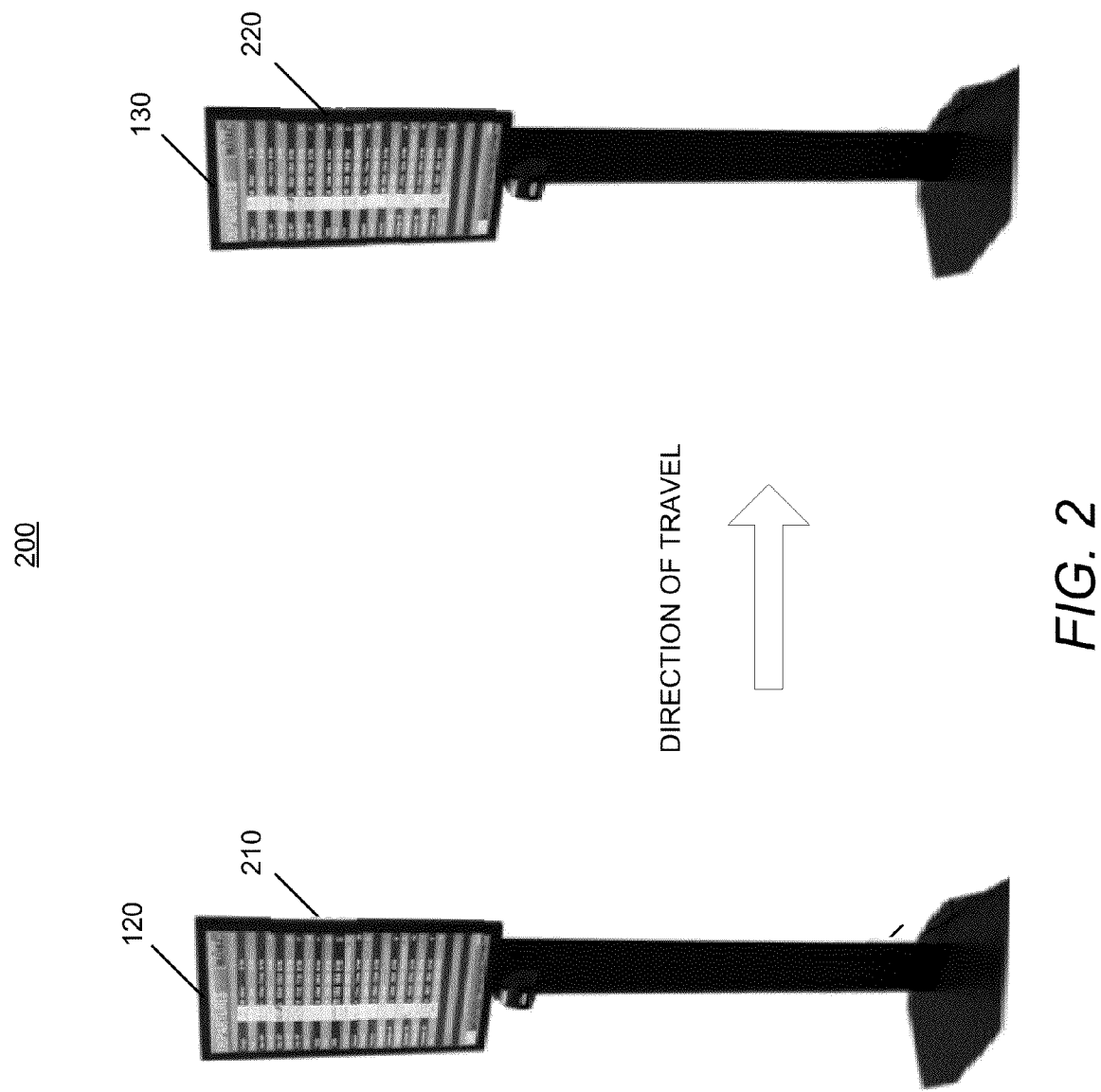
FIG. 2 is a diagram of facial recognition cameras attached to flight information display units showing various content in accordance with a possible embodiment of the disclosure.

FIG. 2 shows an example 200 where the facial recognition cameras 120, 130, 140 may be located on arrival/departure displays, which often catch passengers' attention. For example, the passenger may stop at display 210 and be recognized by facial recognition camera 120, then stop at another display 220 in another part of an airport and be recognized by another facial recognition camera 130. The information may then be sent to the passenger tracking unit 150 which may determine that the same passenger passed both cameras and can calculate the time between the passenger passing display 120 and display 130.

Figure 3A:
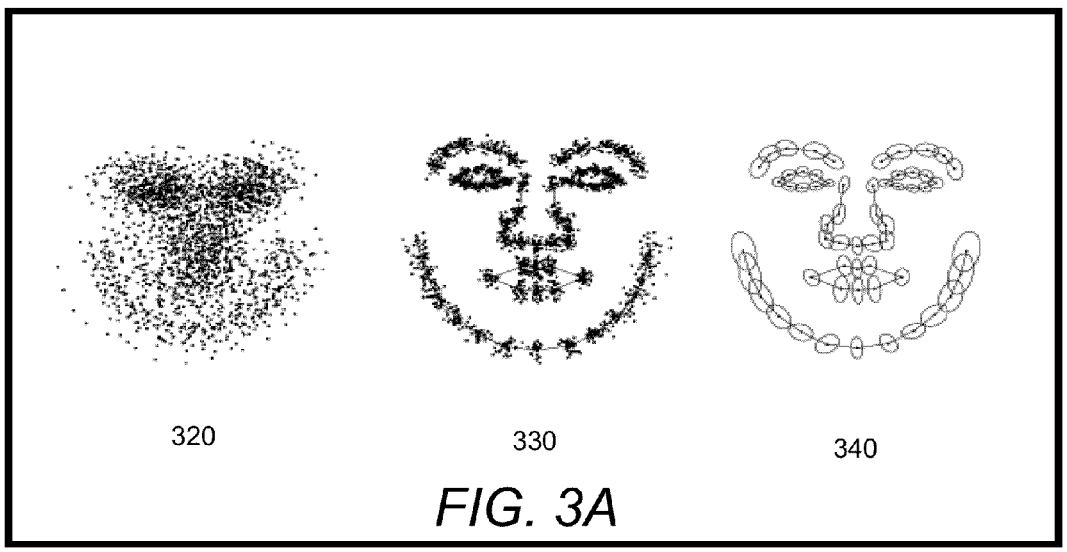
FIGS. 3A and 3B are diagrams of facial recognition processing from facial recognition camera data in accordance with a possible embodiment of the disclosure.
Figure 3B:
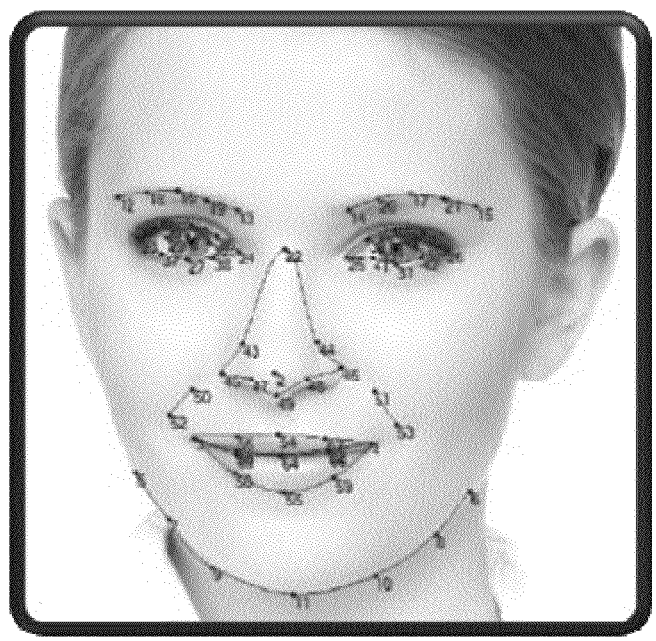

FIGS. 3A and 3B are diagrams of facial recognition processing from facial recognition camera data in accordance with a possible embodiment of the disclosure. From the face 320 in FIG. 3B, FIG. 3A shows an example of the stages of processing 310 after in the facial recognition process. From the image captured by facial recognition camera 120, collections of sets of facial recognition data 320 containing annotated features describing facial features are sent to the passenger tracking unit 150. The set of features 330 represents the collection after being processed by the passenger tracking unit 150. The features 340 represent the variations of facial features after removal of rotation, translation and scale errors. Note that only the facial geometry (e.g., unique points, attributes, etc.) is used for the disclosed embodiments shown in these examples. Other personal features may be used either by themselves or in conjunction with the facial features. While the images are used only for tracking purposes for the disclosed embodiments and are not saved, the facial recognition process of the disclosed embodiments may be used in conjunction with other facial recognition systems such as those used for security purposes. Thus, the captured facial recognition features may deleted after a predetermined time period, such as every 15 minutes, 30 minutes, 1 hours or daily, for example (there is no intention to limit the time period which may vary by facility use, for example).

Figure 4:
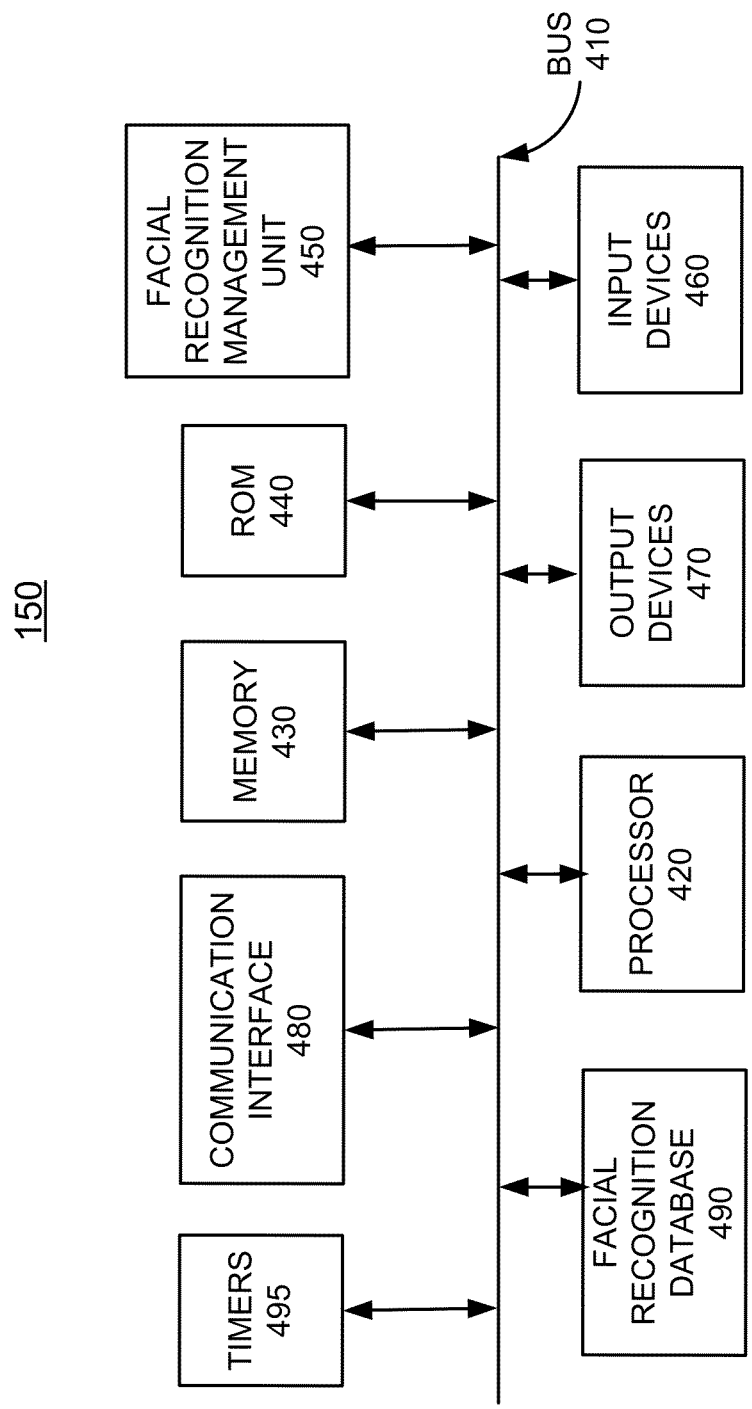
FIG. 4 is a block diagram of an exemplary passenger tracking unit in accordance with a possible embodiment of the disclosure.

FIG. 4 is a block diagram of an exemplary passenger tracking unit 150 in accordance with a possible embodiment of the disclosure. The exemplary passenger tracking unit 150 may include a bus 410, a processor 420, a memory 430, a read only memory (ROM) 440, a facial recognition management unit 450, input devices 460, output devices 470, a communication interface 480, and a facial recognition database 490. Bus 410 may permit communication among the components of the passenger tracking unit 150.

Processor 420 may include at least one conventional processor or microprocessor that interprets and executes instructions. Memory 430 may be a random access memory (RAM) or another type of dynamic storage device that stores information and instructions for execution by processor 420. Memory 430 may also store temporary variables or other intermediate information used during execution of instructions by processor 420. ROM 440 may include a conventional ROM device or another type of static storage device that stores static information and instructions for processor 420. Memory 430 may also represent any type of storage media or media drive, such as, for example, magnetic or optical recording media and its corresponding drive. The facial recognition database 490 may be stored separately or as part of the memory 230 can may contain facial recognition data sent from the facial recognition cameras 120, 130, 140 and/or processed by the facial recognition management unit 450. The data in the facial recognition database 490 may be subject to one of the timers 495 so that the facial recognition management unit 450 may delete the facial recognition data after one of the timers 495 times out to conserve storage space. Another of the timers 495, may be used in tracking the time between facial recognitions of passengers in the travel facility Input device 460 may include one or more conventional mechanisms that may permit a user to input information to the passenger tracking unit 150, such as a keyboard, a mouse, a pen, a voice recognition device, etc. Output device 470 may include one or more conventional mechanisms that output information to the user, including a display, a printer, one or more speakers, or a medium, such as a memory, or a magnetic or optical disk and a corresponding disk drive.

Communication interface 480 may include any transceiver-like mechanism that enables the facial recognition management unit 450 to communicate via a network. For example, communication interface 480 may include a modem, or an Ethernet interface for communicating via a local area network (LAN). Alternatively, communication interface 480 may include other mechanisms for communicating with other devices and/or systems via wired, wireless or optical connections.

The passenger tracking unit 150 may perform such functions in response to processor 420 by executing sequences of instructions contained in a computer-readable medium, such as, for example, memory 430, a magnetic disk, or an optical disk. Such instructions may be read into memory 430 from another computer-readable medium, such as a storage device, or from a separate device via communication interface 480.

The passenger tracking unit 150 illustrated in FIGS. 1 and 4 and the related discussion are intended to provide a brief, general description of a suitable computing environment in which the disclosure may be implemented. Although not required, the disclosure will be described, at least in part, in the general context of computer-executable instructions, such as program modules, being executed by the passenger tracking unit 150, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

For illustrative purposes, the operation of the facial recognition management unit 450 and the passenger tracking process will be described below in FIG. 5 in relation to the diagrams shown in FIGS. 1-4.

Figure 5:
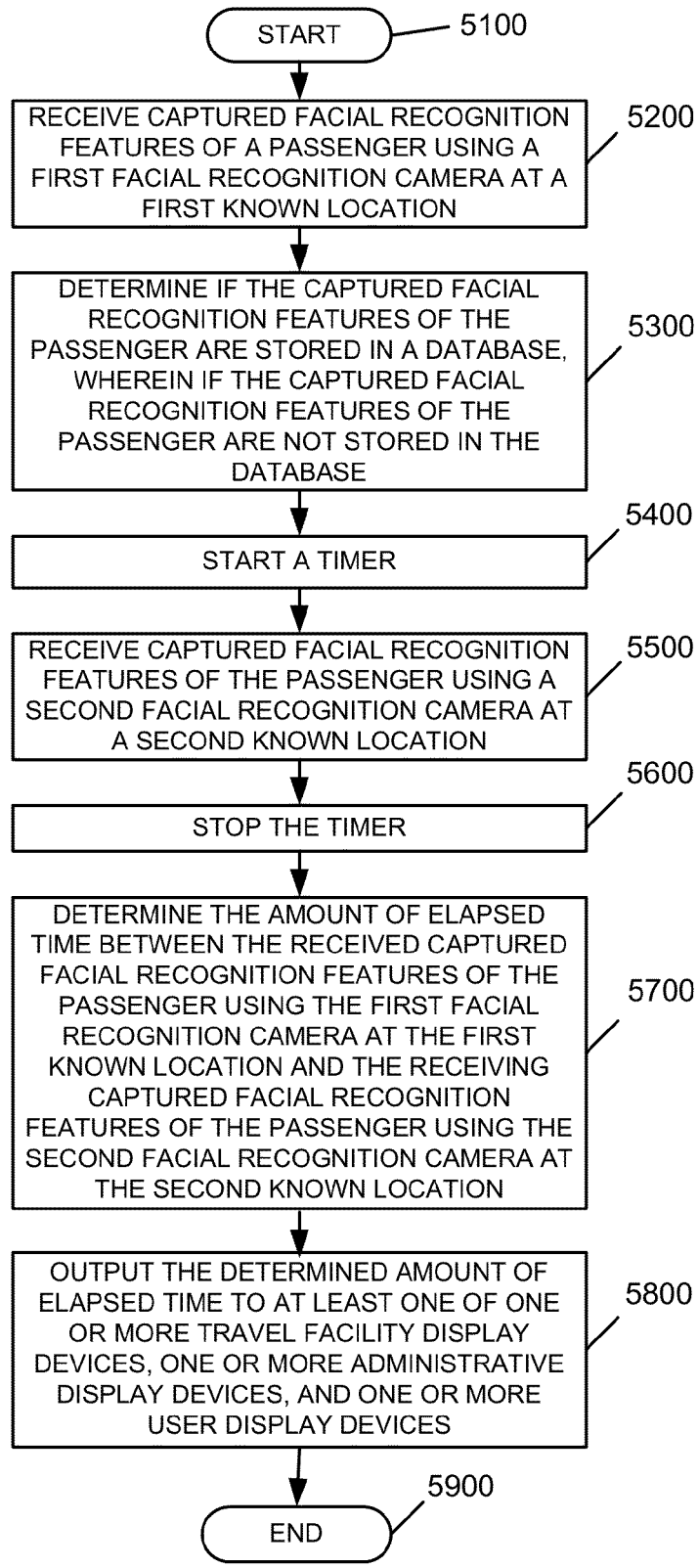
FIG. 5 is an exemplary flowchart of a passenger tracking process in accordance with one possible embodiment of the disclosure.

FIG. 5 is an exemplary flowchart of a passenger tracking process in accordance with one possible embodiment of the disclosure. The process may begin at step 5100 and may continue to step 5200 where the facial recognition management unit 450 may receive captured facial recognition features of a passenger using a first facial recognition camera 120 at a first known location. At step 5300, the facial recognition management unit 450 may determine if the captured facial recognition features of the passenger are stored in a database 490.

If it is determined that the captured facial recognition features of the passenger are not stored in the database 490, the process may go to step 5400 where the facial recognition management unit 450 may start a timer 495. At step 5500, the facial recognition management unit 450 may receive captured facial recognition features of the passenger using a second facial recognition camera 130 at a second known location. Note that the facial recognition management unit 450 may correct the captured facial recognition features for rotation, translation, and scale errors, for example. The first known location and the second known location may be a security checkpoint, a baggage line, a passport checkpoint, or a travel facility walkway, for example.

At step 5600, the facial recognition management unit 450 may stop the timer 495. At step 5700, the facial recognition management unit 450 may determine the amount of elapsed time between the received captured facial recognition features of the passenger using the first facial recognition camera 120 at the first known location and the receiving captured facial recognition features of the passenger using the second facial recognition camera 130 at the second known location. At step 5800, the facial recognition management unit 450 may output the determined amount of elapsed time to at least one of one or more travel facility display devices 160, one or more administrative display devices 170, or one or more user display devices. The process may then go to step 5900 and end.

The facial recognition management unit 450 may also recommend decisions based on the amount of elapsed time. The recommended decisions may be at least one of opening additional security lanes, opening additional passport checking lanes, moving the configuration of security lanes, changing baggage turnstiles, or rerouting passengers through the travel facility, for example.

Figure 6:
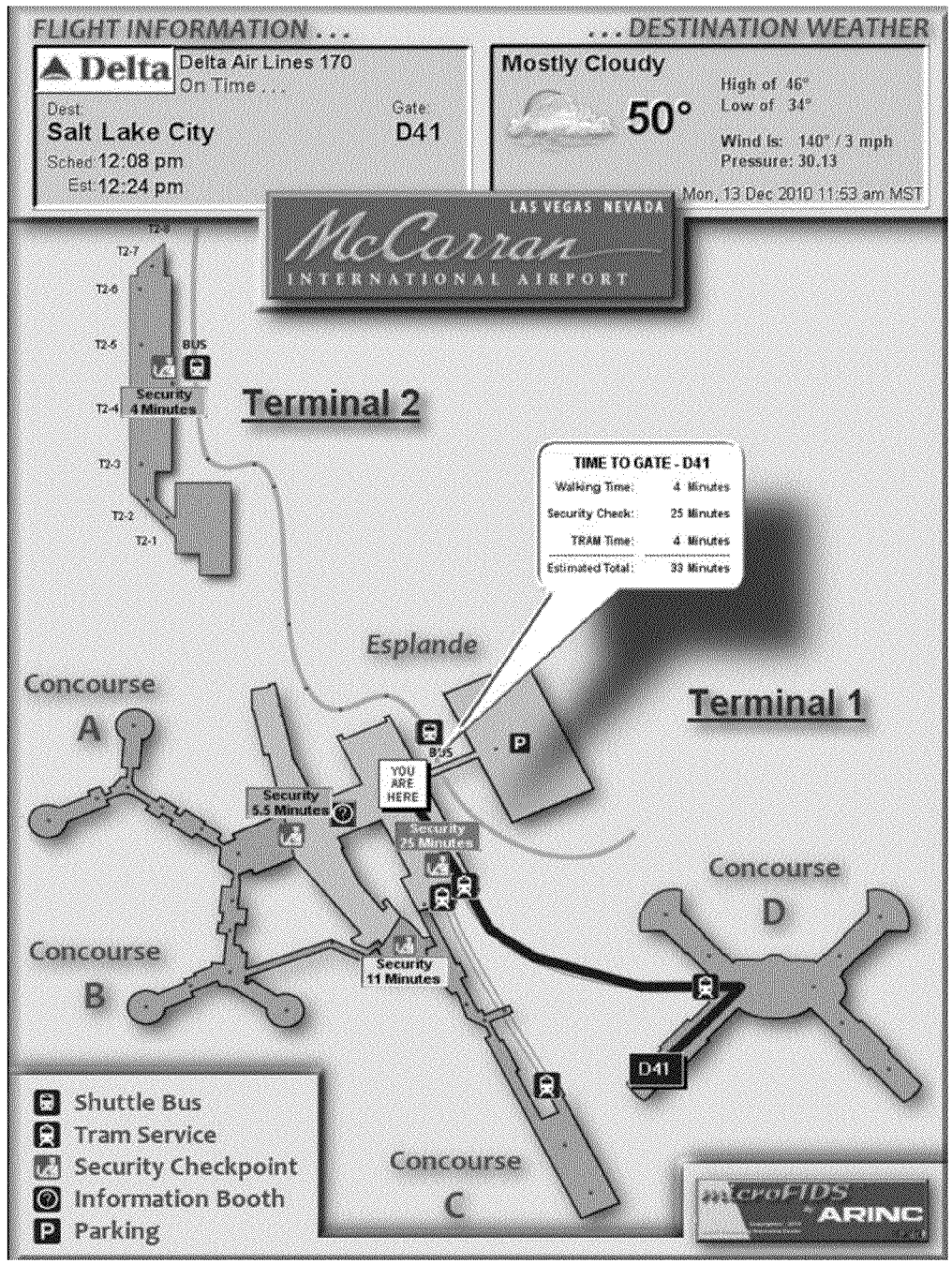
FIG. 6 is an exemplary screenshot of from a travel facility display device 160 in accordance with a possible embodiment of the disclosure.

FIG. 6 is an exemplary screenshot 610 of from a travel facility display device 160 in accordance with a possible embodiment of the disclosure. The travel facility display device 160 may show the average, median, up-to-the-moment, etc. passenger travel (or wait) times through portions of the travel facility and may be positioned at various locations throughout the travel facility. The travel facility display device 160 may also show other information, such as advertisements, flight information (e.g., arrival and departure information, baggage information, etc.)

Figure 7B:
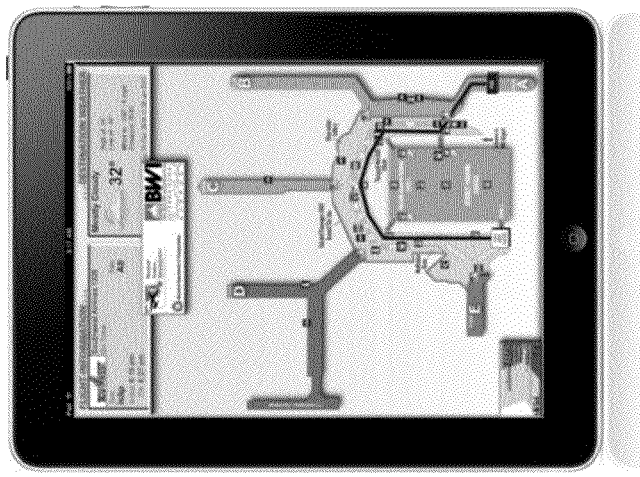
FIG. 7B is an exemplary screenshot of from a user display device in accordance with a possible embodiment of the disclosure.
Figure 7A:
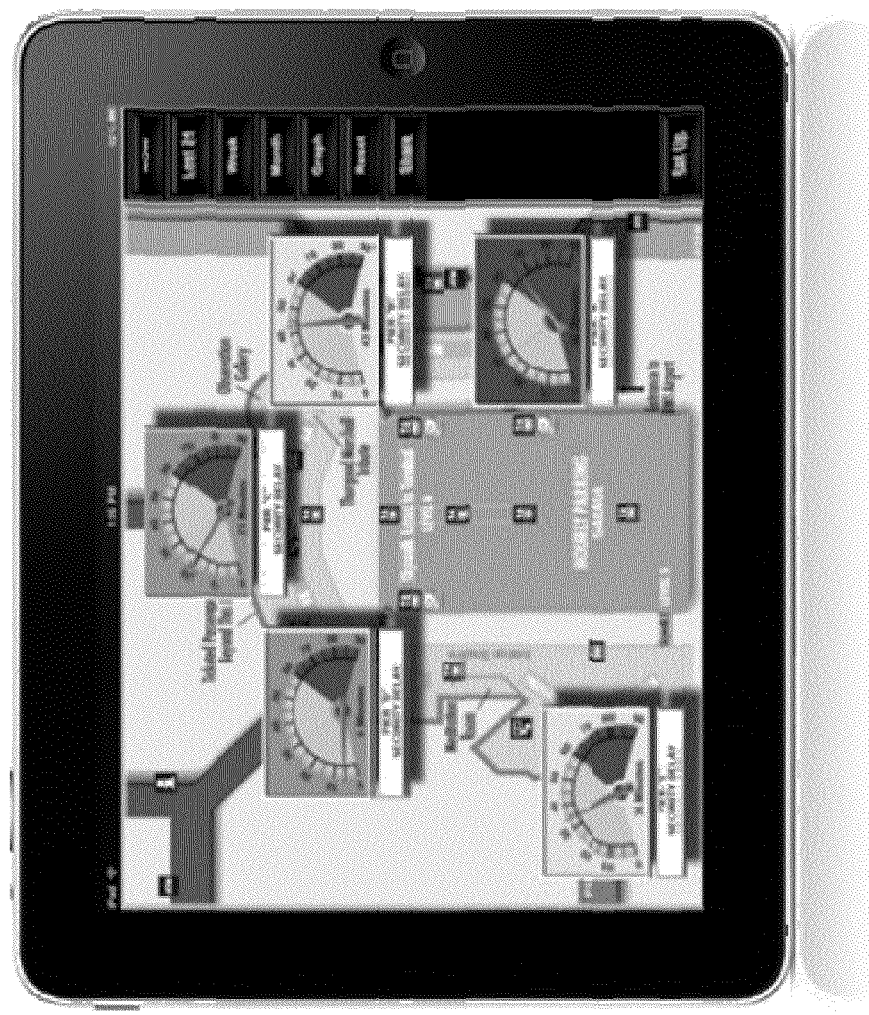
FIG. 7A is an exemplary screenshot of from an administrative display device.

FIG. 7A is an exemplary screenshot 710 of from an administrative display device 170 which may show the average, median, up-to-the-moment, etc. passenger travel (or wait) times through portions of the travel facility. The administrative display device 170 may track and/or show the passenger travel times for the current or past days, hours or minutes, for example. The administrative display device 170 may be an off-the-shelf tablet device or a device especially made for administrative personnel to track passenger travel times as computed by the passenger tracking device 150.

FIG. 7B is an exemplary screenshot of from a user display device 180 in accordance with a possible embodiment of the disclosure. The user display device 180 may be a tablet device that may access Wi-Fi or the internet through an internet website, for example, and communicate with the passenger tracking device 150 for computed passenger travel time information.

Figure 8:
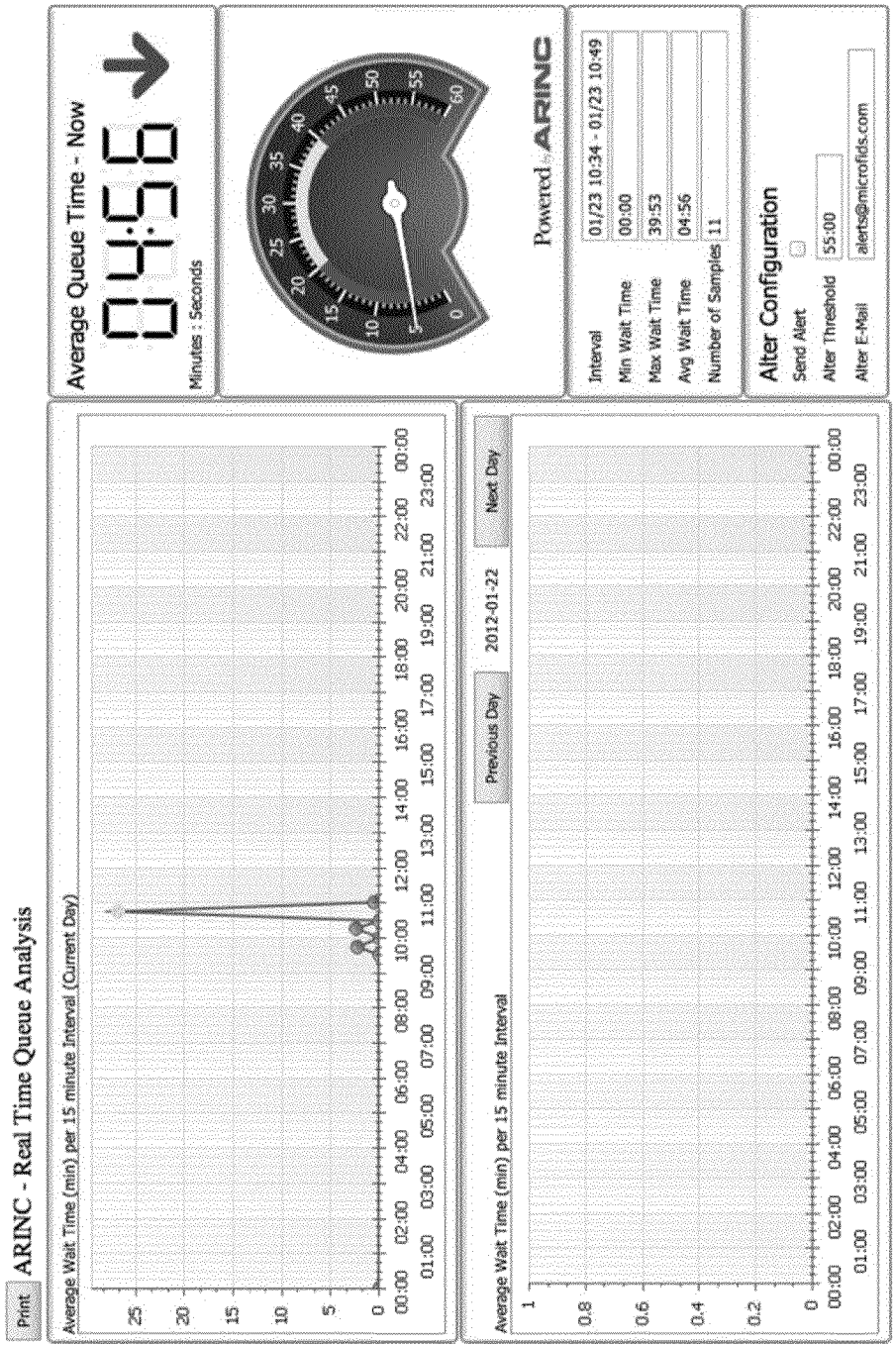
FIG. 8 is an exemplary dashboard showing passenger queue times in accordance with one possible embodiment of the disclosure.

FIG. 8 is an exemplary dashboard 810 showing passenger queue times in accordance with one possible embodiment of the disclosure. The exemplary dashboard 810 may show the average, median, up-to-the-moment, etc. passenger travel (or wait) times through portions of the travel facility for the current or past days, hours or minutes, for example. The dashboard 810 may be configured to display different areas simultaneously or one-at-a-time in a "page through" manner, for example. The dashboard 810 may be made available for viewing from an administrative display device 170 or a user display device 180, for example.

Embodiments within the scope of the present disclosed embodiments may also include computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures. When information may be transferred or provided over a network or another communications connection (either hardwired, wireless, or combination thereof) to a computer, the computer properly views the connection as a computer-readable medium. Thus, any such connection may be properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosed embodiments may be part of the scope of the disclosed embodiments. For example, the principles of the disclosed embodiments may be applied to each individual user where each user may individually deploy such a system. This be enables each user to utilize the benefits of the disclosed embodiments even if any one of the large number of possible applications do not need the functionality described herein. In other words, there may be multiple instances of the disclosed system each processing the content in various possible ways. It does not necessarily need to be one system used by all end users.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

What is claimed is:

1. A method for tracking passengers at a travel facility, comprising:

receiving, with a processor, captured facial recognition features of a passenger using a first facial recognition camera at a first known location;

determining, with the processor, whether the captured facial recognition features of the passenger are stored in a database, and, when it is determined that the captured facial recognition features of the passenger are not stored in the database, starting a timer;

receiving, with the processor, captured facial recognition features of the passenger using a second facial recognition camera at a second known location;

stopping the timer;

determining, with the processor, an amount of elapsed time between the receiving the captured facial recognition features of the passenger using the first facial recognition camera at the first known location and the receiving the captured facial recognition features of the passenger using the second facial recognition camera at the second known location;

determining, with the processor, one or more actions to be taken based on the determined amount of elapsed time;

outputting the determined amount of elapsed time and the determined one or more actions to be taken to at least one of one or more travel facility display devices, one or more administrative display devices, and one or more user display devices; and deleting the captured facial recognition features after a predetermined time period, wherein determined one or more actions being at least one of opening additional security lanes, opening additional passport checking lanes, moving the configuration of security lanes, changing baggage turnstiles, and rerouting passengers through the travel facility, and the captured facial recognition features being limited to measurements of facial geometry corrected for rotation, translation, and scale errors that precludes stored captured facial recognition features being used to reconstitute passenger images.

2. The method of claim 1, wherein the first known location and the second known location are one of a security checkpoint, a baggage line, a passport checkpoint, and travel facility walkways.

3. A passenger tracking unit that tracks passengers at a travel facility, comprising:

a communication interface that facilitates receiving and sending of data;

one or more timers; and a facial recognition management unit that receives captured facial recognition features of a passenger using a first facial recognition camera at a first known location, determines whether the captured facial recognition features of the passenger are stored in a database, and when it is determined that the captured facial recognition features of the passenger are not stored in the database, the facial recognition management unit starts at least one of the one or more timers, receives captured facial recognition features of the passenger using a second facial recognition camera at a second known location, stops the at least one of the one or more timers, determines an amount of elapsed time between the receiving the captured facial recognition features of the passenger using the first facial recognition camera at the first known location and the receiving the captured facial recognition features of the passenger using the second facial recognition camera at the second known location, determines one or more actions to be taken based on the determined amount of elapsed time, outputs the determined amount of elapsed time and the determined one or more actions to be taken to at least one of one or more travel facility display devices, one or more administrative display devices, and one or more user display devices through the communication interface; and deletes the captured facial recognition features after a predetermined time period, wherein the determined one or more actions being at least one of opening additional security lanes, opening additional passport checking lanes, moving the configuration of security lanes, changing baggage turnstiles, and rerouting passengers through the travel facility, and the captured facial recognition features being limited to measurements of facial geometry corrected for rotation, translation, and scale errors that preclude stored captured facial recognition features being used to reconstitute passenger images.

4. The passenger tracking unit of claim 3, wherein the first known location and the second known location are one of a security checkpoint, a baggage line, a passport checkpoint, and travel facility walkways.

5. The passenger tracking unit of claim 3, wherein the passenger tracking unit is a processing device, the processing device being one of a server, a computer, a mobile communication device, a laptop computer, and a personal digital assistant.

6. A non-transitory computer-readable medium storing instructions for controlling a computing device for tracking passengers at a travel facility, the instructions when executed by the computing device cause the computing device to execute the steps of a method comprising:

receiving captured facial recognition features of a passenger using a first facial recognition camera at a first known location;

determining whether the captured facial recognition features of the passenger are stored in a database, and when it is determined that the captured facial recognition features of the passenger are not stored in the database, starting a timer;

receiving captured facial recognition features of the passenger using a second facial recognition camera at a second known location;

stopping the timer;

determining an amount of elapsed time between the receiving the captured facial recognition features of the passenger using the first facial recognition camera at the first known location and the receiving the captured facial recognition features of the passenger using the second facial recognition camera at the second known location;

determining one or more actions to be taken based on the determined amount of elapsed time;

outputting the determined amount of elapsed time and the determined one or more actions to be taken to at least one of one or more travel facility display devices, one or more administrative display devices, and one or more user display devices; and deleting the captured facial recognition features are deleted after a predetermined time period;

wherein the determined one or more actions being at least one of opening additional security lanes, opening additional passport checking lanes, moving the configuration of security lanes, changing baggage turnstiles, and rerouting passengers through the travel facility, and the captured facial recognition features being limited to measurements of facial geometry corrected for rotation, translation, and scale errors that preclude stored captured facial recognition features being used to reconstitute passenger images.

7. The non-transitory computer-readable medium of claim 6, wherein the first known location and the second known location are one of a security checkpoint, a baggage line, a passport checkpoint, and travel facility walkways.

* * * * *